United States Patent [19]

Schmidt

[11] 4,224,394
[45] Sep. 23, 1980

[54] ALKALINE BATTERY, SEPARATOR THEREFORE

[75] Inventor: George F. Schmidt, Neenah, Wis.

[73] Assignee: Kimberly Clark Corporation, Neenah, Wis.

[21] Appl. No.: 57,329

[22] Filed: Jul. 13, 1979

[51] Int. Cl.² ............................................. H01M 2/16
[52] U.S. Cl. .................................................. 429/252
[58] Field of Search ........................ 429/251, 252, 249

[56] References Cited

U.S. PATENT DOCUMENTS

| | | | |
|---|---|---|---|
| 3,036,143 | 5/1962 | Fisher et al. | 136/145 |
| 3,376,168 | 4/1968 | Horowitz | 429/251 X |
| 3,625,770 | 12/1971 | Arrance et al. | 136/145 |
| 3,730,777 | 5/1973 | Krey | 429/251 X |
| 4,085,241 | 4/1978 | Sheibley | 429/254 X |
| 4,168,352 | 9/1979 | Dick et al. | 429/249 X |

OTHER PUBLICATIONS

NASA TM X-3199 "Factors Influencing Flexibility, Resistivity, and Zinc Dendrite Penetration Rate of Inorg. Separators for Alkaline Batteries", Sheibley, Mar. 1975.
NASA TM X-3080 "Structure & Function of an Inorg.-Org. Separator for Electrochem. Cells-Prelim. Study", Bozek, Jul., 1974.
NASA TM X-3465 "New Separators for Nickel-Zinc Batteries", Sheibley.

*Primary Examiner*—Charles F. LeFevour
*Attorney, Agent, or Firm*—William D. Herrick; Wendell K. Fredericks

[57] ABSTRACT

An improved battery separator for alkaline battery cells has low resistance to electrolyte ion transfer and high resistance to electrode ion transfer. The separator is formed by applying an improved coating to an electrolyte absorber. The absorber, preferably, is a flexible, fibrous, and porous substrate that is resistant to strong alkali and oxidation. The coating composition includes an admixture of a polymeric binder, a hydrolyzable polymeric ester and inert fillers. The coating composition is substantially free of reactive fillers and plasticizers commonly employed as porosity promoting agents in separator coatings. When the separator is immersed in electrolyte, the polymeric ester of the film coating reacts with the electrolyte forming a salt and an alcohol. The alcohol goes into solution with the electrolyte while the salt imbibes electrolyte into the coating composition.

When the salt is formed, it expands the polymeric chains of the binder to provide a film coating substantially permeable to electrolyte ion transfer but relatively impermeable to electrode ion transfer during use.

11 Claims, 2 Drawing Figures

ALKALINE BATTERY, SEPARATOR THEREFORE

GENERAL INFORMATION

The invention described herein was made in the performance of work under NASA Contract No. NAS 3-20583 and is subject to the provisions of S 305 of the National Aeronautics and Space Act of 1958 (72 Stat. 435, 42 U.S.C. 2457).

BACKGROUND OF THE INVENTION

1. Field of the Invention

The present invention relates generally to battery separators and particularly to such separators for use, for example, in cells of high energy density secondary alkaline batteries.

2. Description of the Prior Art

An illustrative environment where application of the principles of the present invention is particularly advantageous is in high energy density batteries such as, for example, the batteries as described in U.S. Pat. No. 3,625,770 to Arrance et al dated Dec. 7, 1971.

The patent describes a battery separator designed for silver-zinc (Ag/Zn) alkaline electrolyte cells. The described separator includes a film coat which had been applied from a solvent system onto the outer surface of a fuel-cell grade asbestos substrate. In the cited patent, the film coat formulation comprises: (1) reactive and inert fillers, the reactive fillers being soluble in the alkaline electrolyte; (2) an organic polymer binder, e.g. polyphenylene oxide (PPO); and (3) a plasticizer. Volume resistance of this separator was considered very acceptable, e.g. 14 ohms-cm. This resistance was well below the normally acceptable maximum value for (Ag/Zn) cells of 60 ohms-cm. For further information related to U.S. Pat. No. 3,625,770, see NASA report TMX-3199 "Factors Influencing Flexibility, Resistivity, and Zinc Dendrite Penetration Rate of Inorganic Separators For Alkaline Batteries" which provides an analysis of the film composition. Another report, NASA TMX-3080, "Structure and Function of an Inorganic-Organic Separator For Electrochemical Cells—Preliminary Study" describes the structure and function of the patented separator.

When the (Ag/Zn) separator of the Arrance et al patent was evaluated for use in nickel-zinc (Ni/Zn) cells, it was found that because of the brittle character of the separator, the film coats cracked during handling. Therefore, there appeared to be a need for a more flexible separator.

U.S. Pat. No. 4,085,241, dated Apr. 18, 1978 to Sheibley, describes a new separator having basically the same film coat formulation as described by the Arrance et al patent except that the film coat is more flexible. In the latter patent, the solvent based PPO binder was replaced by a thermoplastic elastomer copolymer. This latter separator also provides acceptable volume resistivity values, e.g. less than 25 ohms-cm. NASA TMX-3465 entitled "New Separators for Nickel-Zinc Batteries" provides further information concerning this flexible separator.

Recognizing possible environmental risks in employing asbestos as a substrate material for battery separators, as well as the added risk of using solvents in the preparation of the coating formulations, the present inventor, George Schmidt, along with Robert Weber, developed aqueous-based substitutes for rubber-binder film coat composition taught in the Sheibley patent. Pending patent application Ser. No. 001,924 to Schmidt and Weber "Flexible Separators for Alkaline Batteries" filed Jan. 8, 1979 discloses the aqueous based substitutes, as well as a new separator material in which the film coat is applied from an aqueous system. The separator may include a meltblown thermoplastic polymer web to replace the asbestos as the separator substrate.

When separator materials of this nature are manufactured, sheeted and stored in layers, undesirable sticking of one sheet to another was observed. This is believed to be due to the inherent tackiness of the binder and the softening effect of the monomeric plasticizers. To resolve this problem, a release liner had to be placed between layers. A search for various other means to avoid the sticking problem was initiated. This search was successful and resulted in the present invention.

The present invention is directed to the improved product which resulted from confronting and solving the basic sticking problem as described above. In the course of the development, additional unforeseen problems were also solved as will be apparent.

SUMMARY

The present invention is directed to a battery separator for use in an alkaline battery cell to separate a negative electrode from a positive electrode when disposed in a suitable electrolyte. In addition to separating the electrodes, the present separator provides relatively low resistance to electrolyte ion transfer but substantially high resistance to electrode ion transfer during cell operation when normal chemical reactions occur.

The separator includes a flexible and fibrous electrolyte absorber and a polymeric film coating adhered thereto. The absorber, which is shaped to form a housing for receiving an electrode, is a flexible substrate treated to be resistant to strong alkali and to oxidation. The absorber material is capable of absorbing electrolyte, holding electrolyte in contact with a housed electrode and acting as a low resistance passageway for electrolyte ion transfer. However, the absorber material by itself does not provide a sufficient barrier to electrode ion transfer.

In the preferred embodiment of the separator, a barrier to electrode ion transfer is provided by coating the absorber with a suitable coating. This coating includes an admixture of a polymeric binder, a hydrolyzable polymeric ester and inert fillers. One polymeric binder is ethylene propylene rubber. A suitable hydrolyzable ester is a film-forming polyacrylate. The inert fillers may be any of a large number of alkali-insoluble pigment materials, including kaolin clays, metallic oxides, titanates and silicates, among many others.

When the thus-coated separator is immersed in alkaline electrolyte, the hydrolyzable polymeric ester reacts chemically with the electrolyte to form a polymeric salt and an alcohol. The alcohol goes into solution. The salt, which is formed during the hydrolysis and which is retained in the coating, expands by embibing additional electrolyte. This expansion forces the polymer chains of the binder further apart and causes an increase in the intermolecular spacing.

The wider spaced intermolecular chains of the polymeric binder provide an overall increase in porosity of the film coating. The resulting increase in porosity of the coating allows for a more rapid diffusion of electrolyte ions through the absorber while still providing a substantial barrier to the large electrode ions emitted by the electrodes. In the absence of a suitable barrier for such electrode ions, dendrites tend to develop on one electrode, and if allowed to reach an opposite polarity electrode, can accumulate to an extent to cause a short circuit of the electrode couple. Such dendrite growth tends to reduce the life of the battery cell.

Excluding plasticizers from the coating formulation reduces considerably the likelihood for stored sheets of separator material to stick together.

Further, when reactive fillers, which are commonly employed as porosity promoting agents in separator coatings, are excluded from the coating formula, there is a reduction in the type of reactants in the electrolyte with might interfere with the electrical output capacity of the cell, and hence improved battery cell performance is realized.

DETAILED DESCRIPTION OF THE PREFERRED EMBODIMENT

Figure 1:
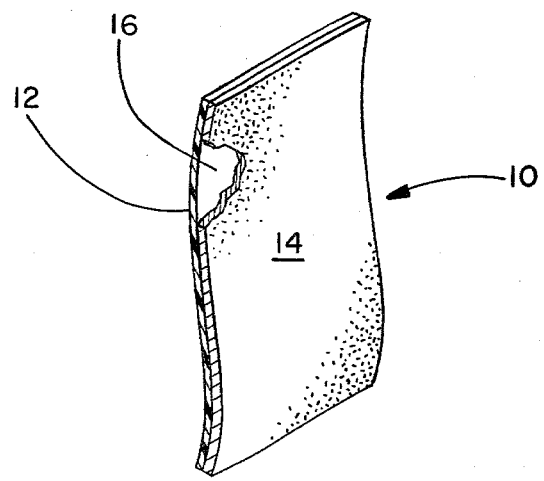
FIG. 1 illustrates a greatly enlarged perspective view of a sheet of battery separator material of this invention.

Referring to the drawing figures, FIG. 1 shows a greatly enlarged perspective view of a separator 10 in accordance with the present invention. Separator 10 includes an electrolyte absorber 12 and a film coating 14 adhered to a top surface 16 of absorber 12.

In the preferred embodiment, electrolyte absorber 12 is comprised of a fuel-cell grade asbestos sheet of about 7 mil thick impregnated with a 5% aqueous dispersion of butyl latex rubber. The impregnated sheet has a basis weight of about 135 g/m². The impregnated sheet is formed on a paper machine, and the 5% solution of rubber is added to the beater before sheet formation. This rubber additive provides the asbestos fibers with good resistance to strong alkali such as potassium hydroxide and inhibits oxidation when the separator is employed in a battery cell.

Coating 14, which is applied to a top surface 16 of absorber 12 by conventional coating means, must also be resistant to strong alkali. In addition, the applied coating 14 must have the ability to flex without cracking while performing the functions of holding out electrode ions and providing low resistance to electrolyte ion transfer during battery operation.

Coating 14 is substantially free of reactive fillers and plasticizer and, in a preferred embodiment, is comprised of 20% of a latex rubber binder, 78% of an inert filler that is insoluble in alkaline electrolyte, and 2% of a hydrolyzable polymeric ester. The latex binder is one sold under the trade designation EMD 603 A by Burke-Palmason Chemical Company of Pompano Beach, Florida. The inert filler in this example is titanium dioxide and the hydrolyzable polymeric ester is a film-forming polyacrylate ester sold under the trade designation of Rhoplex HA-16 by Rhom & Haas Company of Philadelphia, Pennsylvania.

This above described separator 10 was found to have a volume resistivity of 11 ohm-cms in 45% KOH electrolyte.

It is appreciated by those skilled in the art that the electrical resistance of the separator material is a valuable indicator of the performance of the material when it is employed as a separator in working cells of a battery. This is so because the voltage loss in battery cells can be calculated from separator material resistance values.

In addition to the embodiment described above, other materials suitable for use as absorber material in this invention and commonly used in other prior art battery cell applications include flexible webs of potassium titanate fiber paper, aluminum silicate fiber paper, cellulose paper, mixtures of synthetic wood pulp and asbestos fibers and the same fibers as components of woven and nonwoven fabrics. The absorber may have a thickness of from about 5 to 20 mils and a basis weight in the range of about 25 to 200 g/m². The absorber webs should be free of trace metals and impurities such as iron, copper and silver and should be hydrophilic.

Ionomer dispersions may also be used as suitable alternatives for the latex binder of butyl latex rubber mentioned previously. While butyl latex rubber binder may present minor blocking problems there are other binders (e.g. polyethylene and ionomers) that avoid blocking but are less desirable because their resinuous nature leads to stiffer coatings with reduced resistance to cracking. Depending on the fibers used for absorber material, these alternate binders may comprise from about 10 to 40% of the coating formulation. While these coating formulations work equally well from an aqueous or solvent base system, because of environmental and cost considerations, it is preferable that the binder be applied from an aqueous system.

It is believed the entire class of film-forming polyacrylate esters may be used as suitable ingredients in the coating formulation. Butyl, ethyl, and methyl acrylates and methacrylates used alone or in combination are film-forming polyacrylates known to be suitable for use in this invention. Depending upon which absorber material is employed, these alternate polyacrylate esters may comprise from about 1 to 16% of the coating formulations.

Other suitable inert fillers in addition to that named in the preferred embodiment may be selected from the group consisting of nonorganic materials such as kaolin clays, metallic oxides, titanates, silicates, organic and the like, and may be powdered or fibrous particles of a suitable size. Also, depending on which absorber material is employed, these alternate fillers may comprise from about 10 to 80% of the coating formulation.

In preparing the film coating, the inert fillers are first finely dispersed in water with the aid of a colloid mill. The polyacrylate ester is added gradually while the filler dispersion is stirred with a low shear mixer. The polymeric binder is then added and the combination is again thoroughly stirred to form a smooth coating mixture.

In applying the coating, the top surface 16 of the absorber 14, a suitable conventional paper coating method may be used. Coating applicators such as reverse rolls, gravure rolls, Mayer rods, air knives and the like are suitable for this purpose. The coating weights as applied may range from between about 60 to 160 g/m². After the coating is applied, it may be allowed to dry to film form at room temperature, but preferably is force dried with heat or other suitable means to accelerate the drying process.

The preferred embodiment of separator material 10 should have the following properties: (1) sufficient physical strength to provide strong mechanical spacing between electrodes in the cell; (2) minimum resistance to electrolyte ion flow; (3) sufficient flexibility to be formed into electrode housing units without cracking; (4) good electrical insulation properties; (5) reasonably strong chemical resistance to degradation by electrolyte or other active materials; (6) an effectiveness in preventing migration of electrode ions and particles between electrodes of opposite polarity and; 7) dimensional stability over the entire range of thermodynamic and electrochemical conditions encountered during cell operation.

During cell operation the coating 14 reacts with the electrolyte and tends to swell. The typical reaction which takes place between the electrolyte (KOH) and the polyacrylate ester of the coating 14 is illustrated in the following formula:

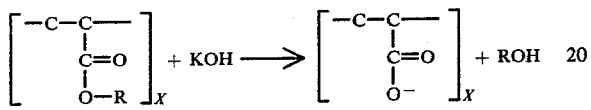

As indicated, salt and an alcohol are formed. The salt is retained in the film coating while the alcohol goes into solution in the electrolyte.

Unlike plasticizers of the prior art film coating compositions wherein azelaic acid salts as well as glycols are formed, the polyacrylate ester used in this invention does not form a soluble acid salt. Accordingly only a low molecular weight alcohol goes into solution with the electrolyte.

The salt retained in the coating causes the coating to swell. It is believed the retained polymeric salt forces the polymer chains of the binder apart and causes increased spacing of the coating structure. Surprisingly, by having this increased spacing of the coating structure, a very low resistance separator material is obtained without the use of the costly reactive filler materials commonly employed as porosity promoting agents in separator coating formulations.

When employed in battery cells of the type which may include electrode "couples" of silverzinc, silver-cadmium, or nickel-zinc materials, a pair of separators are commonly shaped to form a housing for enclosing one of the electrodes. Oftentimes an absorber is also used to house the other electrode.

Figure 2:
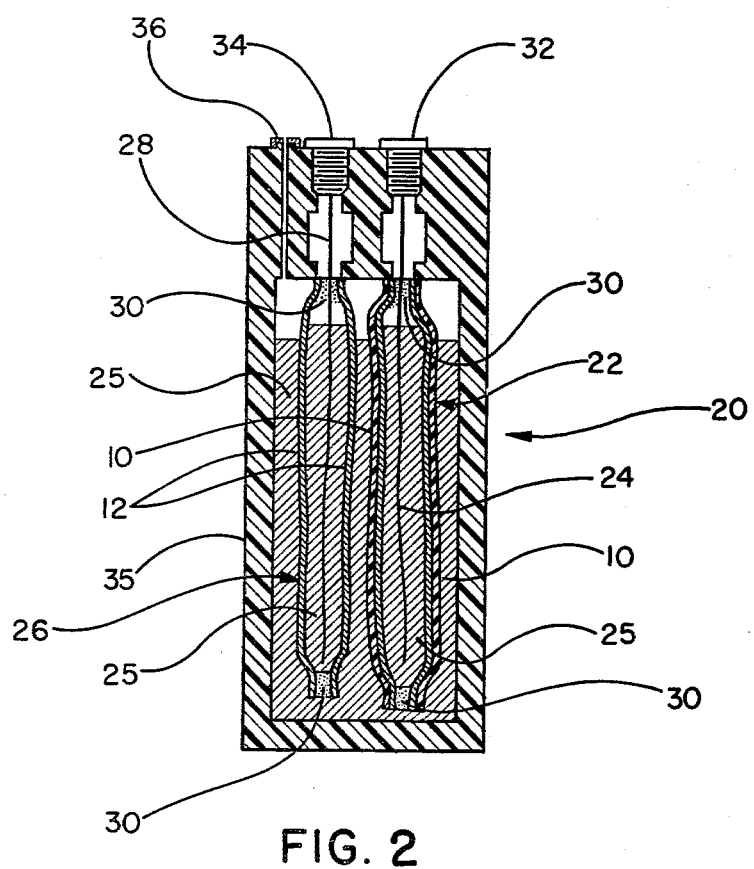
FIG. 2 is a cross section view of an alkaline battery cell employing an absorber which is housing a first electrode and the battery separator of the present invention which is housing a second electrode.

With reference to FIG. 2, there is illustrated in exaggerated size for illustrative purposes a cross-section of an alkaline cell 20 comprising a glass container 35 with a separator housing 22 disposed about a negative electrode 24 and an absorber housing 26 disposed about a positive electrode 28. Separator housing 22 comprises a pair of battery separators 10—10 of FIG. 1 sealed along the edges by an alkali resistant sealer 30. Absorber housing 26, similarly constructed, comprises a pair of absorber sheets 12—12 of FIG. 1. In cell 20, the negative electrode 24 is enclosed in separator housing 22 since reduction occurs at the negative electrode during charging and dendrites of sharp toothlike projection build up on the negative electrode. Absorber housing 26 may be used to enclose the positive electrode during charging of the cell. The electrodes 26 and 28 are suitably electrically connected to negative and positive terminals 32 and 34 respectively to form opposite polarity cell output terminals. The electrodes and housings are partially immersed in a solution of electrolyte 25, preferably at 35-45% solution of potassium hydroxide KOH. A port 36 is provided to permit venting excess gas which might develop during charging and to provide an access port for adding electrolyte.

It is to be understood that the above-described embodiments are mainly illustrative of the principles of the invention. One skilled in the art may make changes and modifications to the embodiments disclosed herein and may devise other embodiments without departing from the scope and the essential characteristics thereof.

I claim:

1. An improved battery separator for use in an alkaline battery cell for physically separating electrodes of said cell and for controlling the transfer of ions in an electrolyte solution during chemical reactions of said cell, in which said separator includes an absorber comprised of a flexible and fibrous substrate, resistant to strong alkali and oxidation while holding electrolyte in contact with said electrode and being permeable to the electrolyte ion transfer, said improvement comprising:
   a film coating on at least one side of said absorber comprising an admixture of:
   (1) a polymeric binder;
   (2) a hydrolyzable polyacrylate ester; and
   (3) inert fillers; said coating being substantially free of plasticizers and reactive fillers, said polyacrylate ester being of the type which expands when immersed in said electrolyte solution to increase the porosity of said coating during use without the need for reactive fillers to thereby provide a permeable film coating that allows for rapid diffusion of electrolyte ions through said absorber while providing a substantial barrier to electrode ions emitted by said electrodes, whereby voltage loss is reduced and battery cell life is improved.

2. A separator in accordance with claim 1 wherein said binder is selected from the group consisting of butyl latex rubber and ethylene propylene terpolymer.

3. A separator in accordance with claim 1 wherein said hydrolyzable polyacrylate ester is a film-forming polyacrylate ester.

4. A separator in accordance with claim 1 wherein said inert fillers are powdered or fibrous and are selected from the group consisting of kaolin clays, metallic oxides, titanates and silicates of a suitable size and wherein said fillers are substantially insoluble in alkaline electrolyte.

5. A separator in accordance with claim 4 wherein said coating includes from 10 to 40% by weight of said binder, from 1 to 16% by weight of said film-forming polyacrylate and from 10 to 80% by weight of said inert fillers.

6. A battery separator for separating electrodes immersed in a solution of alkaline electrolyte in a battery cell, the resistance of said separator with respect to electrolyte ion transfer being different from electrode ion transfer during chemical reactions within said cell, comprising:
   (a) a flexible, fibrous absorber resistant to strong alkali and oxidation;
   (b) a film coating permeable to electrolyte ions and impermeable to electrode ions adhered to at least one surface of said absorber; said coating comprising of a admixture of:
   (1) a polymer binder;
   (2) a hydrolyzable polyacrylate ester; and
   (3) inert fillers; said coating being substantially free of plasticizers and reactive fillers, said polyacrylate ester being of the type which expands when immersed in said electrolyte to increase the porosity of said film coating to provide a permeable film coating that allows for rapid diffusion of electrolyte ions through said absorber while providing a substantial barrier to electrode ions emitted by said electrodes and thereby reducing voltage loss while improving battery cell life.

7. The battery separator of claim 6 wherein said absorber is a substrate of porous and flexible fibers impregnated with a rubber binder and wherein said film coating is adhered to at least one surface of said impregnated substrate and wherein said coated absorber is sealed along cut edges with said alkali resistant adhesive.

8. A battery separator in accordance with claim 7 wherein said absorber is a fuel-cell grade asbestos sheet of about 7 mil thick, wherein said sheet is impregnated with a butyl latex rubber dispersion for making said absorber resistant to mechanical and electrochemical attack of said electrolyte.

9. The battery separator of claim 6 wherein said coating includes 10–40% by weight of said binder, 16% by weight of said hydrolyzable polyacrylate ester, and 10–80% by weight of inert fillers.

10. The battery separator of claim 9 wherein said binder is a butyl latex rubber, said hydrolyzable polyacrylate ester is a film-forming polyacrylate ester and said inert fillers are selected from the group consisting of titanate, silicate and metallic oxides, of a suitable size, said fillers being substantially insoluble in alkaline electrolyte.

11. A battery separator in accordance with claim 9 wherein said rubber binder is ethylpropylene terpolymer.

* * * * *